United States Patent [19]
Kawahara

[11] Patent Number: 6,129,140
[45] Date of Patent: Oct. 10, 2000

[54] VEHICULAR AIR CONDITIONER

[75] Inventor: Tatsuhide Kawahara, Aichi-ken, Japan

[73] Assignee: Mitsubishi Heavy Industries, Ltd., Tokyo, Japan

[21] Appl. No.: 08/934,853

[22] Filed: Sep. 22, 1997

[51] Int. Cl.[7] .................................................. B60H 3/00
[52] U.S. Cl. .................................. 165/42; 165/43; 62/244
[58] Field of Search ......................... 165/41, 42, 43; 62/244

[56] References Cited

U.S. PATENT DOCUMENTS

| | | | |
|---|---|---|---|
| 4,098,093 | 7/1978 | Czyl | 62/244 |
| 4,258,555 | 3/1981 | Scharm | 62/244 |
| 4,505,330 | 3/1985 | Sherman | 123/41.48 |
| 5,335,718 | 8/1994 | Smith | 165/42 |
| 5,701,949 | 12/1997 | Yamaguchi et al. | 165/42 |
| 5,755,107 | 5/1998 | Shirota | 62/244 |

*Primary Examiner*—Ira S. Lazarus
*Assistant Examiner*—Terrell McKinnon

[57] ABSTRACT

In a vehicular air conditioner having an insertion hole for inserting an air filter adjacently on the upstream side of an evaporator, the air filter is inserted and mounted along guide rails provided on the upper and lower inside walls of a cooler case, and a drain pan and a drain port are formed at the cooler case bottom surface portion corresponding to the installation position of the evaporator, a drain groove extends from the lower cooler case bottom surface portion on the upstream side of the lower guide rail to the drain pan to prevent the rainwater, sucked together with the air and blocked by the lower guide rail, from leaking into the cabin and to discharge the rainwater to the outside of the vehicle.

9 Claims, 4 Drawing Sheets

VEHICULAR AIR CONDITIONER

FIELD OF THE INVENTION

The present invention relates to a vehicular air conditioner.

DESCRIPTION OF THE RELATED ART

FIG. 4 is a longitudinal sectional view of a conventional vehicular air conditioner, FIG. 5 is a side view of a cooler case located in the center of the air conditioner, and FIG. 6 is a sectional view taken along the line B—B of FIG. 5. In FIGS. 4 to 6, reference numeral 2 denotes a fan case, 3a denotes an upper cooler case, 3b denotes a lower cooler case which constitutes one cooler case integrally with the upper cooler case 3a, 4 denotes a heater case, 13 denotes a band for connecting the fan case 2 to the upper and lower cooler cases 3a and 3b, which are of a vertically divided structure, and 14 denotes a band for connecting the heater case to the upper and lower cooler cases 3a and 3b. The above-mentioned elements and an air outlet duct (not shown) which connects with the heater case 4 constitute a casing 1, and an air passage is formed in the casing 1. A blowing fan 5 is provided in the fan case 2, and driven by a direct-connected electric motor (not shown). Reference numeral 41 denotes an inside air inlet port provided in the fan case 2, 42 denotes an outside air inlet port, and 9 denotes an inside/outside air switching damper. By turning this damper, either of the inlet ports is opened to selectively introduce the air inside the cabin or the air outside the cabin. Arrow marks in FIG. 4 indicate the air flow direction.

An evaporator 6 is provided in the upper and lower cooler cases 3a and 3b on the downstream side of the blowing fan 5. Although not shown in the figures, the evaporator 6 has a refrigerant inlet and a refrigerant outlet. The refrigerant inlet is connected to an expansion valve via a refrigerant pipe, and the refrigerant outlet is connected to a compressor via a refrigerant pipe. Reference numeral 30 denotes a drain pan provided in the lower cooler case 3b, and 31 denotes a drain port.

Reference numeral 7 denotes a heater provided in the heater case 4 on the downstream side of the evaporator 6, and 8 denotes an air mix damper in the vicinity of the heater 7 on the upstream side thereof. Although not shown in the figures, the heater 7 has a hot water inlet and a hot water outlet, which are connected to a cooling water circuit of the vehicle engine via hot water pipes so that a circulating circuit is formed. The air mix damper is turned from a position for shutting off the air flow to the heater (position indicated by solid lines in FIG. 4) to a position for opening the front of the heater 7 (position indicated by broken lines in FIG. 4) and vice versa so that the heating of air by the heater can be regulated. Reference numeral 43 denotes a blowout passage connecting with an air outlet (not shown).

An air filter 15 is provided in the vicinity of the evaporator 6 on the upstream side thereof to remove dust and smell in the sucked air and to supply fresh air into the cabin. The air filter 15 can be detached from the side of the cooler cases 3a and 3b in the state in which the casing 1 is mounted on a vehicle because the air filter 15 requires maintenance such as cleaning and replacement of element thereof.

When the vehicular air conditioner of the above configuration is operated, the blowing fan 5 is rotated, so that the air inside the cabin or the air outside the cabin is introduced through the inlet port and sent under pressure into the air passage in the casing 1. The air is filtered and deodorized by the air filter 15, entering the evaporator 6, where the air is cooled in the process of passing through the gaps between fins by heat exchanging with the refrigerant flowing in the tube, and then the air is sent out to the air passage on the upstream side of the heater 7. The cooled air is separated into the air passing through the heater 7 and the air bypassing the heater 7 depending on the rotational position of the air mix damper 8, and mixed again at the down stream side of the heater 7, so that the conditioned air whose temperature is controlled is blown into the cabin through the air outlet selected by an air outlet switching mode damper (not shown).

As shown in FIG. 5, an insertion hole 18 is formed at the side of the upper and lower cooler cases 3a and 3b to mount the air filter 15. On the other hand, protruding guides 17a and 17b are formed on the upper and lower surfaces of the body of the air filter 15 as shown in FIG. 4, and guide rails 16a and 16b are provided on the upper and lower inside wall surfaces of the upper and lower cooler case 3a and 3b as shown in FIGS. 4 to 6. The guides 17a and 17b of the air filter 15 are inserted into the grooves of the guide rails 16a and 16b, respectively, by which the air filter 15 is held. As shown in FIG. 6, the insertion hole 18 at the side of the upper and lower cooler cases 3a and 3b is provided with an air filter attaching plate 32, and the air filter 15 is fixed with a flange 33 thereof screwed via a wind leak preventive insulation 34. In FIG. 6, the air filter is indicated by two-dot chain lines.

When the outside air is introduced to operate the conventional air conditioner in rainy weather, the rainwater sucked through the outside air inlet port 42 together with the air is blocked by the guide rail 16b provided on the bottom surface of the lower cooler case 3b, and accumulated on the bottom surface of the cooler case 3b at the root of the guide rail. The accumulated water permeates the insulation 34 interposed between the air filter attaching plate 32 of the upper and lower cooler cases 3a and 3b and the flange 33 of the air filter 15, and finally turns to waterdrops, which leak from the insulation 34 and drop onto the floor surface of vehicle, so that the floor gets wet.

OBJECT AND SUMMARY OF THE INVENTION

An object of the present invention is to eliminate the aforesaid drawback of the prior art and to prevent the wetting of the cabin floor due to the sucked rainwater.

Specifically, an object of the present invention is to prevent the rainwater, which is sucked together with the air and blocked by the lower guide rail, from leaking into the cabin and to discharge the rainwater to the outside of the vehicle in a vehicular air conditioner in which an insertion hole for inserting an air filter adjacently on the upstream side of an evaporator, the air filter is inserted and mounted along guide rails provided on the upper and lower inside walls of a cooler case, and a drain pan and a drain port are formed at the cooler case bottom surface portion corresponding to the installation position of the evaporator.

Accordingly, to achieve the above object, the present invention provides a vehicular air conditioner in which a blowing fan, evaporator, air mix damper, heater, and air outlet switching mode damper are provided in an air passage formed between an air inlet port and an air outlet port in a casing having the air inlet port at one end and the air outlet port at the other end, an insertion hole for inserting an air filter adjacently on the upstream side of the evaporator is provided at the side of a cooler case, which are of a vertically divided structure, constituting a part of the casing, the air filter is inserted and mounted along guide rails provided on the upper and lower inside walls of the cooler case, and a drain pan and a drain port are formed at the cooler case bottom surface portion corresponding to the installation position of the evaporator, the vehicular air conditioner being characterized in that a drain groove is provided so as to extend from the lower cooler case bottom surface portion on the upstream side of the lower guide rail to the drain pan.

DETAILED DESCRIPTION OF PREFERRED EMBODIMENTS

Figure 1:
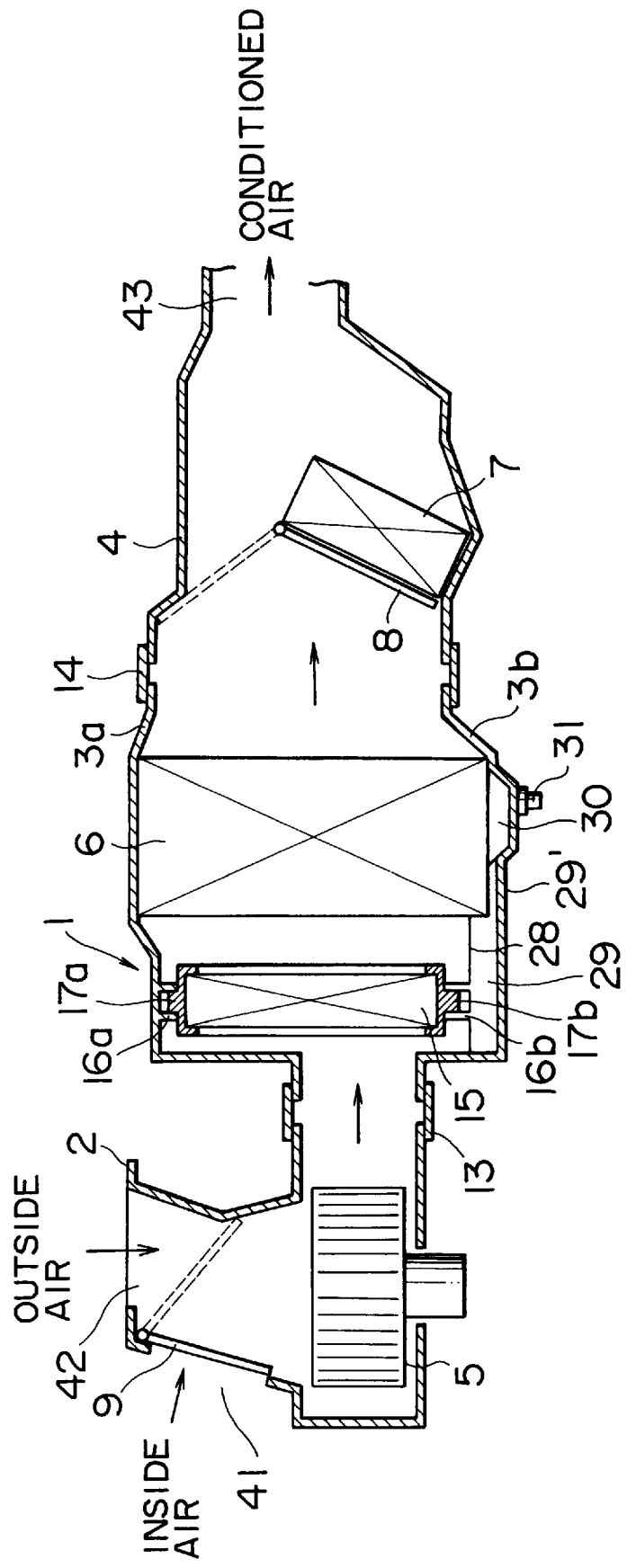
FIG. 1 is a longitudinal sectional view of a vehicular air conditioner in accordance with one embodiment of the present invention.
Figure 2:
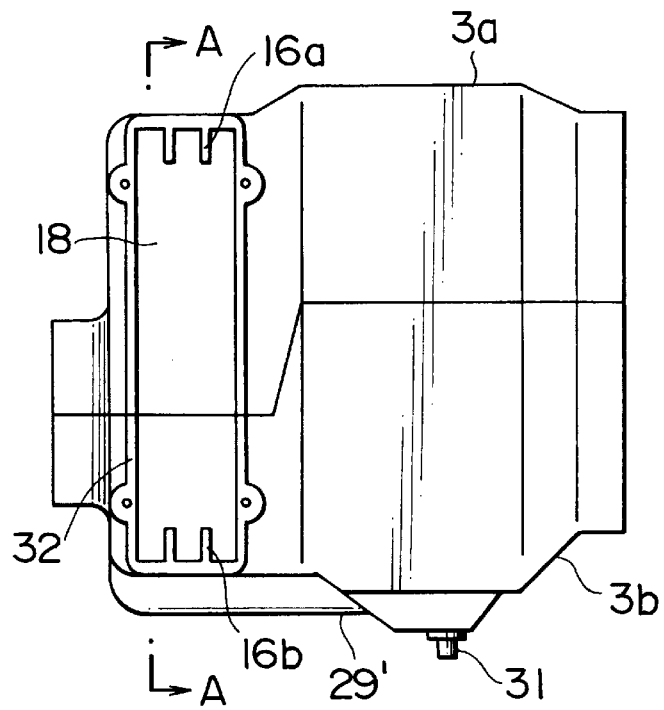
FIG. 2 is a side view of a cooler case of the air conditioner shown in FIG. 1, excluding an air filter.
Figure 3:
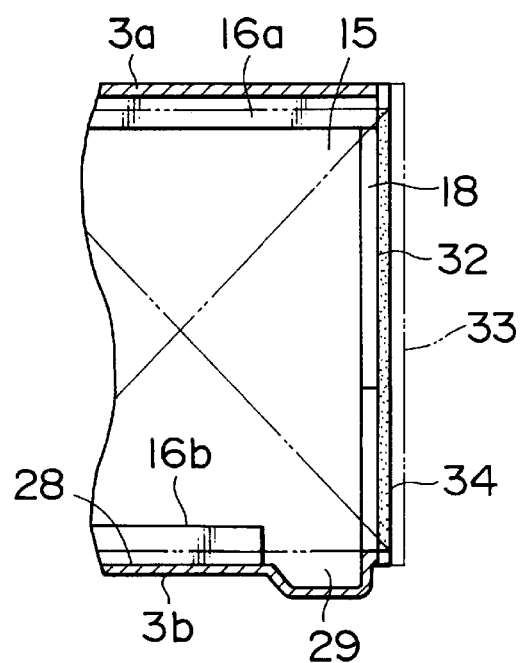
FIG. 3 is a partial sectional view taken along the line A—A of FIG. 2.
Figure 4:
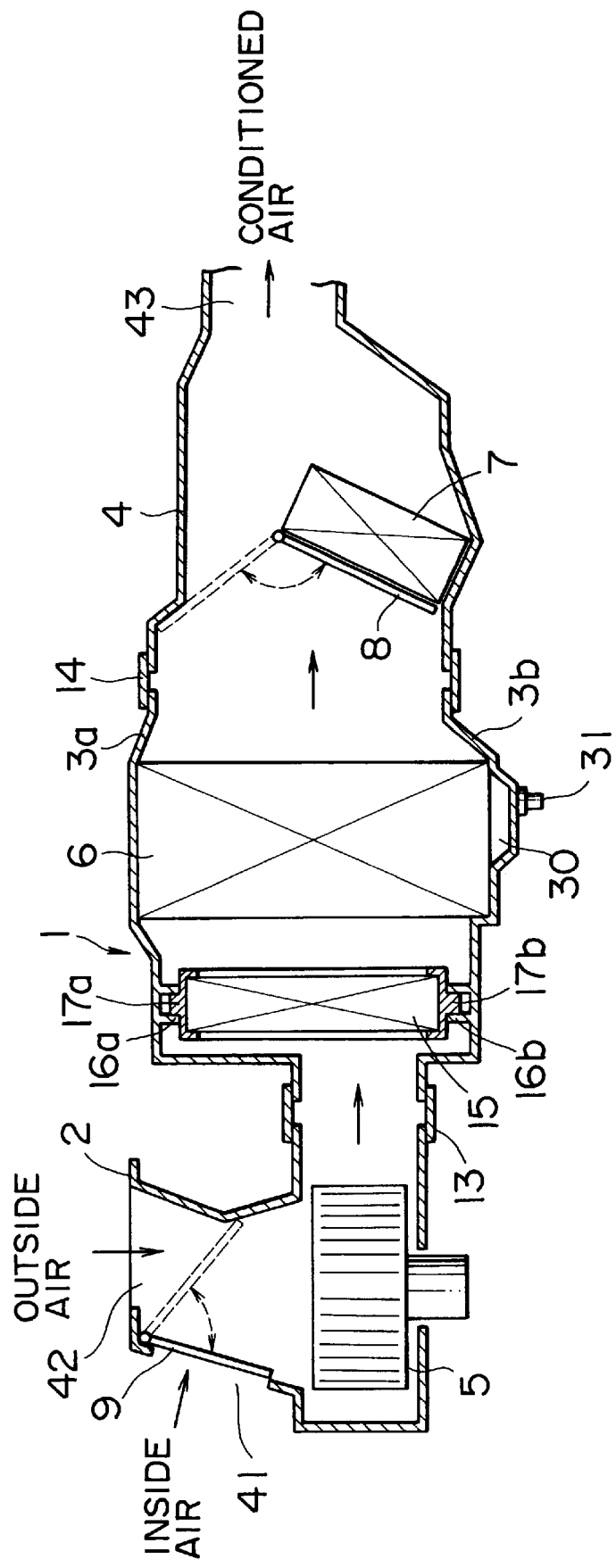
FIG. 4 is a longitudinal sectional view of a conventional vehicular air conditioner.
Figure 5:
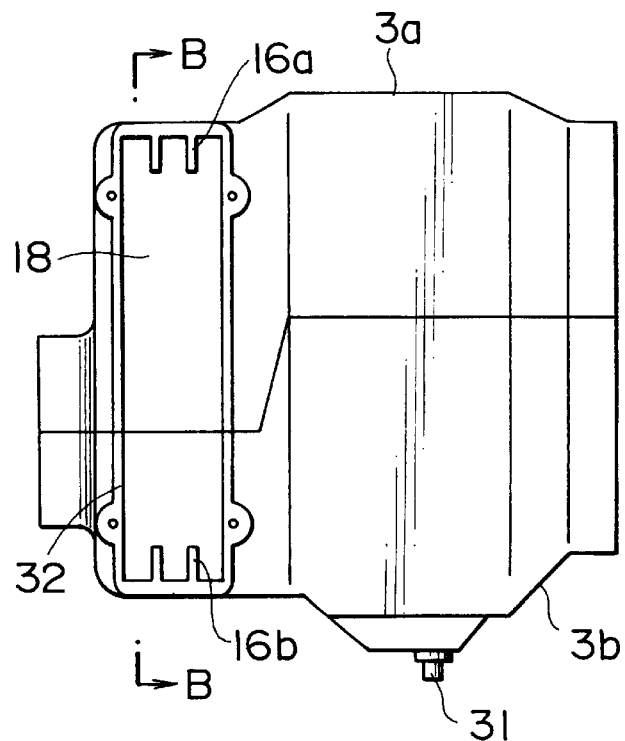
FIG. 5 is a side view of a cooler case of the air conditioner shown in FIG. 4, excluding an air filter.
Figure 6:
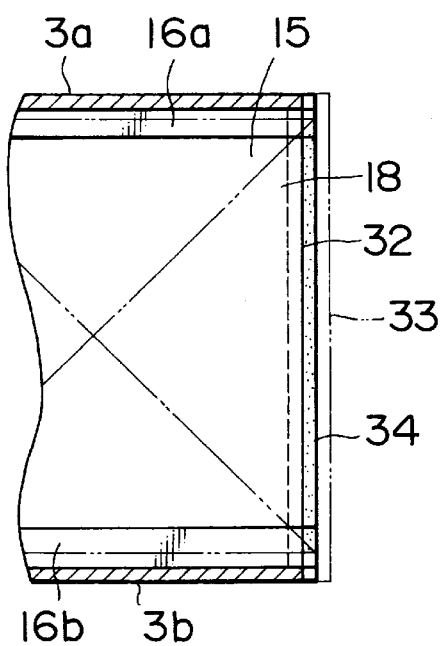
FIG. 6 is a partial sectional view taken along the line B—B of FIG. 5.

FIG. 1 is a longitudinal sectional view of a vehicular air conditioner in accordance with one embodiment of the present invention, FIG. 2 is a side view of a cooler case located in the center of the air conditioner, and FIG. 3 is a sectional view taken along the line A—A of FIG. 2. In FIGS. 1 to 3, the same reference numerals are applied to the same elements as those in FIGS. 4 to 6.

In FIGS. 1 and 3, reference numeral 28 denotes the bottom surface of the lower cooler case 3b, and 29 denotes a drain groove formed in the lower cooler case 3b. The drain groove 29 connects the upstream side of the guide rail 16b with the drain pan 30 at a position lower than the bottom surface 28 of the lower cooler case 3b. Specifically, the drain groove 29 extends from the lower cooler case bottom surface portion on the upstream side of the lower guide rail 16b to the drain pan 30. In FIGS. 1 and 2, reference numeral 29' denotes a swell of the drain groove 29 protruding from the lower part of the lower cooler case 3b. The configuration of portions other than described above is the same as that of the prior art (FIGS. 4 to 6); therefore, the explanation is omitted.

In this apparatus, the rainwater entering from the upstream side of the air filter 15 is temporarily blocked by the guide rail 16b, but flows into the drain pan 30 through the drain groove 29, and discharged to the outside of the apparatus through a drain port 31 together with the drain of the evaporator 6. Thereupon, the rainwater is prevented from permeating into the insulation 34 interposed between the air filter attaching plate 32 and the flange 33 of the air filter 15, so that the waterdrops are prevented from dropping onto the floor surface of the vehicle and from wetting the floor.

In the vehicular air conditioner in accordance with the present invention, since the drain groove extending from the lower cooler case bottom surface portion on the upstream side of the lower guide rail to the drain pan, the rainwater which is sucked together with the air and blocked by the lower guide rail flows into the drain pan through the aforesaid drain groove, and discharged to the outside of the vehicle through the drain port. Therefore, according to the vehicular air conditioner of the present invention, the rainwater is prevented from leaking into the cabin and from wetting the floor.

What is claimed is:

1. A vehicular air conditioner having an air filter, comprising:

a casing having an inlet opening, to which air is provided, and an outlet port for exhausting conditioned air, said casing having an insertion hole at a side portion thereof;

a drain pan provided at a bottom of said casing and downstream of said insertion hole;

a first guide rail, provided at an inside bottom portion of said casing, for receiving the air filter inserted in said casing through said insert hole;

a drain groove provided at the bottom of said casing extending from an upstream side of said guide rail to regions directly below said insertion hole to said drain pan, such that water entering from said inlet opening is drained from said drain pan through said drain groove and prevented from leaking outside said casing through said insertion hole.

2. The vehicular air conditioner according to claim 1, wherein an air outlet switching mode damper is provided at said air outlet port.

3. The vehicular air conditioner according to claim 1, further comprising:

a blowing fan adapted, to provide the air into said casing through said inlet opening.

4. The vehicular air conditioner according to claim 1, further comprising:

a heater provided in said casing between said inlet opening and said outlet port; and an air mix damper adapted to adjust the amount of air provided to said heater.

5. The vehicular air conditioner according to claim 1, further comprising:

a second guide rail provided inside said casing at an upper wall thereof, wherein said first guide rail receives a bottom portion of said air filter and said second guide rail receives a top portion of the air filter.

6. The vehicular air conditioner according to claim 1, wherein said casing has a vertically divided structure.

7. The vehicular air conditioner according to claim 1, wherein said drain groove is provided at a peripheral portion of the bottom of said casing.

8. The vehicular air conditioner according to claim 1, wherein said drain groove is provided at a peripheral portion of the bottom of said casing, and said first guide rail is provided in said casing excluding said peripheral portion.

9. The vehicular air conditioner according to claim 1, further comprising:

an insulation provided at an outside wall of said casing around said insertion hole.

* * * * *